(12) United States Patent
Ko et al.

(10) Patent No.: US 12,003,301 B2
(45) Date of Patent: *Jun. 4, 2024

(54) METHOD AND APPARATUS FOR ULTRA RELIABLE AND LOW LATENCY COMMUNICATION

(71) Applicant: ELECTRONICS AND TELECOMMUNICATIONS RESEARCH INSTITUTE, Daejeon (KR)

(72) Inventors: Young Jo Ko, Daejeon (KR); Seok Ki Kim, Daejeon (KR); Seung Kwon Baek, Daejeon (KR); Woo Ram Shin, Daejeon (KR); Chan Ho Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,148

(22) Filed: Oct. 28, 2022

(65) Prior Publication Data

US 2023/0046967 A1    Feb. 16, 2023

Related U.S. Application Data

(63) Continuation of application No. 16/857,864, filed on Apr. 24, 2020, now Pat. No. 11,533,097.

(30) Foreign Application Priority Data

Apr. 26, 2019 (KR) .................. 10-2019-0049253
Apr. 24, 2020 (KR) .................. 10-2020-0049715

(51) Int. Cl.
*H04B 7/06* (2006.01)
*H04B 17/336* (2015.01)
(Continued)

(52) U.S. Cl.
CPC ......... *H04B 7/0626* (2013.01); *H04B 17/336* (2015.01); *H04L 1/0026* (2013.01);
(Continued)

(58) Field of Classification Search
None
See application file for complete search history.

(56) References Cited

U.S. PATENT DOCUMENTS 10,154,437 B2   12/2018  Bhushan et al.
10,187,135 B2    1/2019  Kim et al.
(Continued)

FOREIGN PATENT DOCUMENTS

KR     101451418 B1   10/2014
WO    2014077577 A1    5/2014
WO    2017107084 A1    6/2017

OTHER PUBLICATIONS

Qualcomm Incorporated, "HARQ design for URLLC", R1-1612079, 3GPP TSG-RAN WG1 #87, Nov. 14-18, 2016, Reno, USA.

*Primary Examiner* — Scott M Sciacca
(74) *Attorney, Agent, or Firm* — Rabin & Berdo, P.C.

(57) ABSTRACT

An operation method of a terminal may comprise receiving, from a base station, information of target transmission points targeted for a report of first channel state information (CSI) among the plurality of transmission points; receiving a first CSI-reference signal (CSI-RS) from the target transmission points; transmitting the first CSI determined based on the first CSI-RS to the base station; receiving, from the base station, information on a first transmission point determined based on the first CSI; receiving, from the first transmission point indicated by the information on the first transmission point, a second CSI-RS; receiving, from the base station,
(Continued)

information on a requirement; and transmitting, to the base station, a second CSI including a transmission parameter for achieving the requirement.

17 Claims, 7 Drawing Sheets

(51) Int. Cl.
 *H04L 1/00* (2006.01)
 *H04L 5/00* (2006.01)
 *H04W 24/10* (2009.01)
(52) U.S. Cl.
 CPC .......... *H04L 5/0035* (2013.01); *H04L 5/0048* (2013.01); *H04L 5/0057* (2013.01); *H04W 24/10* (2013.01)

(56) References Cited

U.S. PATENT DOCUMENTS

| | | | |
|---|---|---|---|
| 2008/0095185 | A1 | 4/2008 | DiGirolamo et al. |
| 2012/0108250 | A1* | 5/2012 | Ahn ...................... H04L 1/1671 |
| | | | 455/450 |
| 2014/0177601 | A1 | 6/2014 | Nishio et al. |
| 2016/0044729 | A1 | 2/2016 | Tu et al. |
| 2016/0142189 | A1 | 5/2016 | Shin et al. |
| 2018/0123765 | A1 | 5/2018 | Cao et al. |
| 2019/0260459 | A1 | 8/2019 | Jeon et al. |
| 2019/0305911 | A1 | 10/2019 | Sarkis et al. |
| 2020/0296699 | A1 | 9/2020 | Matsuda et al. |
| 2021/0007126 | A1 | 1/2021 | Su et al. |
| 2021/0168641 | A1 | 6/2021 | Frenne et al. |
| 2021/0168821 | A1 | 6/2021 | Chen et al. |
| 2021/0211242 | A1* | 7/2021 | Andgart ................ H04L 1/1864 |

* cited by examiner

100

METHOD AND APPARATUS FOR ULTRA RELIABLE AND LOW LATENCY COMMUNICATION

CROSS-REFERENCE TO RELATED APPLICATIONS

This application is a continuation application of U.S. patent application Ser. No. 16/857,864 filed on Apr. 24, 2020, and claims priority to Korean Patent Applications No. 10-2019-0049253 filed on Apr. 26, 2019 and No. 10-2020-0049715 filed on Apr. 24, 2020 with the Korean Intellectual Property Office (KIPO), the entire contents of which are hereby incorporated by reference.

BACKGROUND

1. Technical Field

The present disclosure relates to a method and an apparatus for ultra reliable and low latency communication (URLLC) in a communication system, and more specifically, to a method for multi-level scheduling, a method for combining orthogonal transmission and non-orthogonal transmission, and a method for channel state information (CSI) feedback.

2. Related Art

Controls of factory automation can be performed through communications among a control apparatus, sensors, and actuators. In general, communication packets used for the controls of factory automation may have a short length, and may be generated with a very short periodicity. A closed loop control process of the factory automation may have a cycle composed of a command transfer from the control apparatus to an actuator, execution of the command at the actuator, measurement at a sensor after execution of the command, and reporting of a value measured by the sensor to the control apparatus, and this cycle may be repeated continuously. In order to implement such the wire-based closed loop control in a wireless manner, a wireless-based closed loop control may also need to ensure a level of low latency and high reliability required in the wire-based closed loop control. Therefore, wireless communication for the factory automation may belong to a domain of the ultra-reliable and low-latency communication (URLLC) services in the fifth generation new radio (NR) communication.

From the perspective of a wireless network, the control apparatus may be a base station, and the sensors and actuators may be terminals. For example, transmission from the control apparatus to the actuators may be downlink transmission, and transmission from the sensors to the control apparatus may be uplink transmission.

Some factory automation machines may require a low block error rate (BLER) of $10^{-9}$ or less and an end-to-end (E2E) communication latency of 1 ms or less. In order for the machines to operate without errors, all communications among the control apparatus, sensors and actuators related to operation of the machines need to satisfy the reliability and latency requirements. Therefore, the wireless network for the factory automation should be able to provide a communication link capable of satisfying the required reliability and latency while maintaining efficiency of radio resources used therefor.

SUMMARY

Accordingly, exemplary embodiments of the present disclosure provide a method and an apparatus for ultra reliable and low latency communication (URLLC) in a communication system, and more specifically, provide a method for multi-level scheduling, a method for combining orthogonal transmission and non-orthogonal transmission, and a method for channel state information (CSI) feedback.

According to a first exemplary embodiment of the present disclosure, an operation method of a terminal comprises receiving, from a base station, information of target transmission points targeted for a report of first channel state information (CSI) among a plurality of transmission points; receiving a first CSI-reference signal (CSI-RS) from the target transmission points; transmitting the first CSI determined based on the first CSI-RS to the base station; receiving, from the base station, information on first transmission points which are determined based on the first CSI among the target transmission points; receiving a second CSI-RS from the first transmission points indicated by the information on the first transmission points; receiving, from the base station, information on a requirement; and transmitting, to the base station, second CSI including one or more transmission parameters for achieving the requirement.

The first CSI may be a long-term CSI, the first CSI may include information on estimated signal-to-noise ratios (SNRs) for wireless channels from the target transmission points to the terminal and information on interference-to-noise ratios (INRs) for the wireless channels in a second resource, and the second resource may be a resource that the target transmission points do not use for transmission.

When the information on the requirement includes a target block error rate (BLER) and a target throughput, the second CSI may include the one or more transmission parameters for achieving the target BLER and the target throughput.

The target throughput may be a predetermined size of a packet to be transmitted or a predetermined frequency utilization efficiency of the packet to be transmitted.

The one or more transmission parameters may include at least one of precoder information, modulation and coding scheme (MCS) information, transmission power information, and resource allocation information.

The operation method may further comprise, when a packet includes a plurality of transmit blocks, receiving, by the terminal, a first transmit block of the packet; performing, by the terminal, decoding on the first transmit block; when the decoding fails, receiving, by the terminal, a second transmit block; and performing, by the terminal, decoding on the first and second transmit blocks.

The operation method may further comprise, when a packet includes a plurality of transmit blocks, receiving, by the terminal, a first transmit block of the packet; performing, by the terminal, decoding on the first transmit block; when the decoding succeeds, transmitting, by the terminal, a signal for requesting to stop transmission of the packet to the base station.

The operation method may further comprise, when decoding is performed using all transmit blocks included in the packet, but the decoding fails, transmitting a negative acknowledgment (NACK) signal to the base station.

The operation method may further comprise, when the transmit blocks included in the packet further include one or more orthogonal transmit blocks allocated to orthogonal resources and one or more non-orthogonal transmit blocks allocated to non-orthogonal resources, receiving the non-orthogonal transmit blocks; and performing decoding on the one or more orthogonal transmit blocks and the one or more non-orthogonal transmit blocks.

According to a second exemplary embodiment of the present disclosure, an operation method of a base station comprises transmitting, to a terminal, information of target transmission points targeted for a report of first channel state information (CSI) among a plurality of transmission points; transmitting a first CSI-reference signal (CSI-RS) to the terminal through the target transmission points; receiving the first CSI determined based on the first CSI-RS from the terminal; transmitting information on first transmission points determined based on the first CSI to the terminal; transmitting, to the terminal, a second CSI-RS through the first transmission points indicated by the information on the first transmission points; and transmitting, to the terminal, information on a requirement.

The first CSI may be a long-term CSI, the first CSI may include information on estimated signal-to-noise ratios (SNRs) for wireless channels from the target transmission points to the terminal and information on interference-to-noise ratios (INRs) for the wireless channels in a second resource, and the second resource may be a resource that the target transmission points do not use for transmission.

The operation method may further comprise, when the information on the requirement includes a target block error rate (BLER) and a target throughput, receiving, from the terminal, information one or more transmission parameters for achieving the target BLER and the target throughput in a first resource.

The target throughput may be a predetermined size of a packet to be transmitted or a predetermined frequency utilization efficiency of the packet to be transmitted.

The one or more transmission parameters may include at least one of precoder information, modulation and coding scheme (MCS) information, transmission power information, and resource allocation information.

The operation method may further comprise, when a packet includes a plurality of transmit blocks, receiving, from the terminal, a second CSI including one or more candidate transmission parameters for achieving the requirement in a first resource indicated by the resource allocation information; determining one or more transmission parameters used for downlink transmission based on the one or more candidate transmission parameters; transmitting a first transmit block of the packet to the terminal; and when there is no request to stop transmission of the packet from the terminal, transmitting a second transmit block of the packet to the terminal.

The operation method may further comprise receiving a negative acknowledgment (NACK) signal from the terminal; and retransmitting the packet to the terminal.

The operation method may further comprise, when the transmit blocks included in the packet further include one or more orthogonal transmit blocks allocated to orthogonal resources and one or more non-orthogonal transmit blocks allocated to non-orthogonal resources, transmitting the one or more non-orthogonal transmit blocks to the terminal through the first transmission points.

According to a third exemplary embodiment of the present disclosure, a terminal comprises a processor; and a memory storing at least one instruction executable by the processor, wherein when executed by the processor, the at least one instruction causes the processor to: receive, from a base station, information on a requirement including a target block error rate (BLER) and a target throughput; and transmit, to the base station, including information on one or more transmission parameters for achieving the target BLER and target throughput.

The target throughput may be a predetermined size of a packet to be transmitted or a predetermined frequency utilization efficiency of the packet to be transmitted.

The one or more transmission parameters may include at least one of precoder information, modulation and coding scheme (MCS) information, transmission power information, and resource allocation information.

Using the multi-level scheduling according to the exemplary embodiments of the present disclosure, L1/L2 control signaling is not required unless it is absolutely necessary, so that overhead due to the L1/L2 control signaling can be reduced, and reception reliability related problems can be prevented. In addition, the terminal can perform demodulation and decoding not only when an entire packet is received through allocated resources but also when only a portion of the packet is received, so that resource consumption can be reduced.

Using the method of combining orthogonal transmission and non-orthogonal transmission according to the exemplary embodiments of the present disclosure, initial transmit blocks can use orthogonal resources, and subsequent transmit blocks can use non-orthogonal resources, so that the resources used for packet transmission can be allocated in advance, and resource utilization efficiency can be increased.

Using the channel state information (CSI) feedback method according to the exemplary embodiments of the present disclosure, two types of CSI can be used. Transmission point(s) (TP(s)) for transmitting data to the terminal can be determined based on the first type CSI, and channels state between the terminal and the base station may be estimated based on the second type CSI. Accordingly, the data can be transmitted to the terminal through the appropriate TP(s), so that the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

Figure 1:
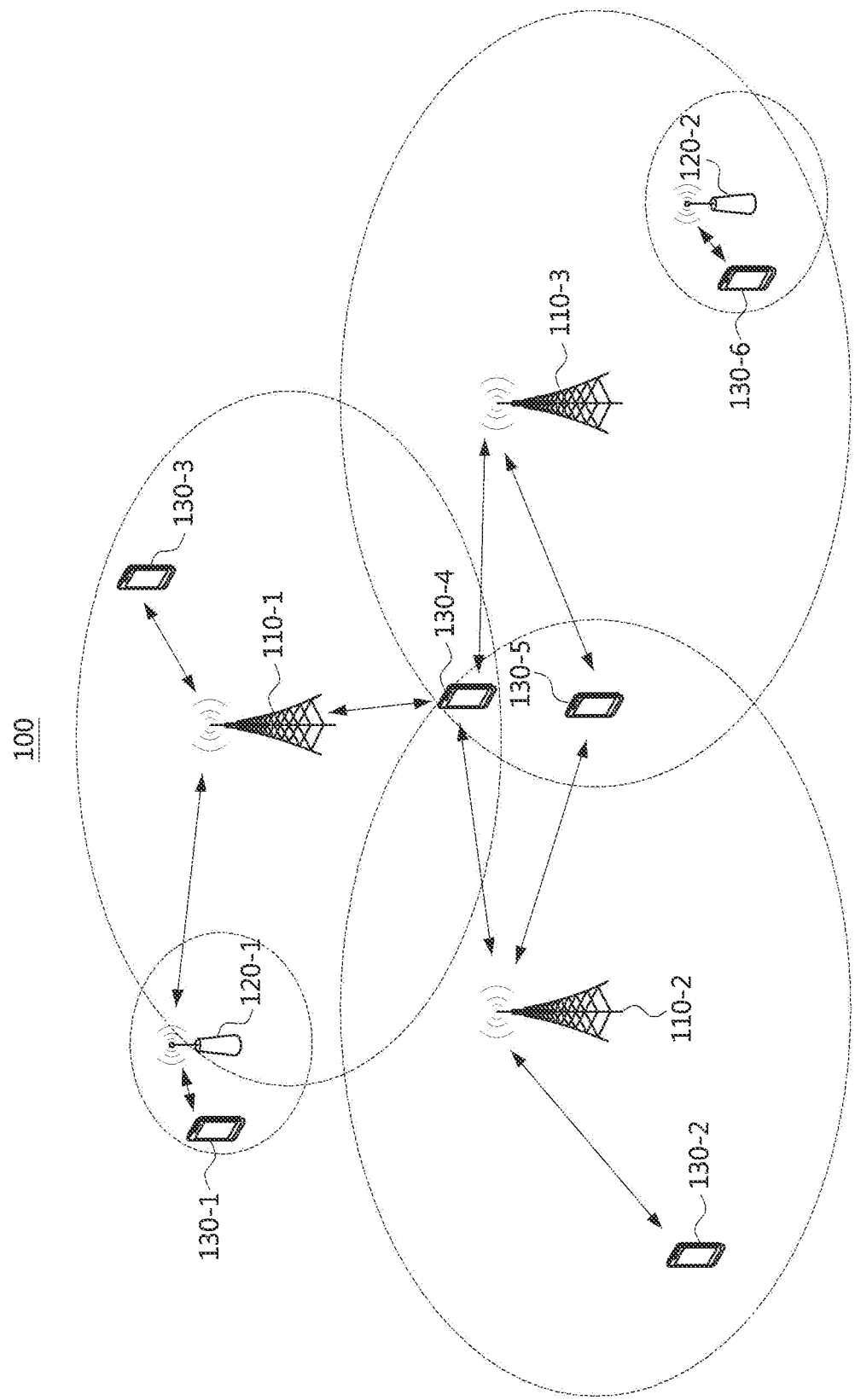
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further include a core network (e.g., a serving-gateway (S-GW), a packet data network (PDN) gateway (P-GW), a mobility management entity (MME), etc.).

The plurality of communication nodes may support 4G communication (e.g., long term evolution (LTE) and LTE-Advance (LTE-A)), 5G communication, or the like specified by the $3^{rd}$ generation partnership project (3GPP) standards. The 4G communication may be performed in a frequency band of 6 GHz or below, and the 5G communication may be performed in a frequency band of 6 GHz or above as well as the frequency band of 6 GHz or below. For example, for the 4G and 5G communications, the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, and the like. Each of the plurality of communication nodes may have the following structure.

Figure 2:
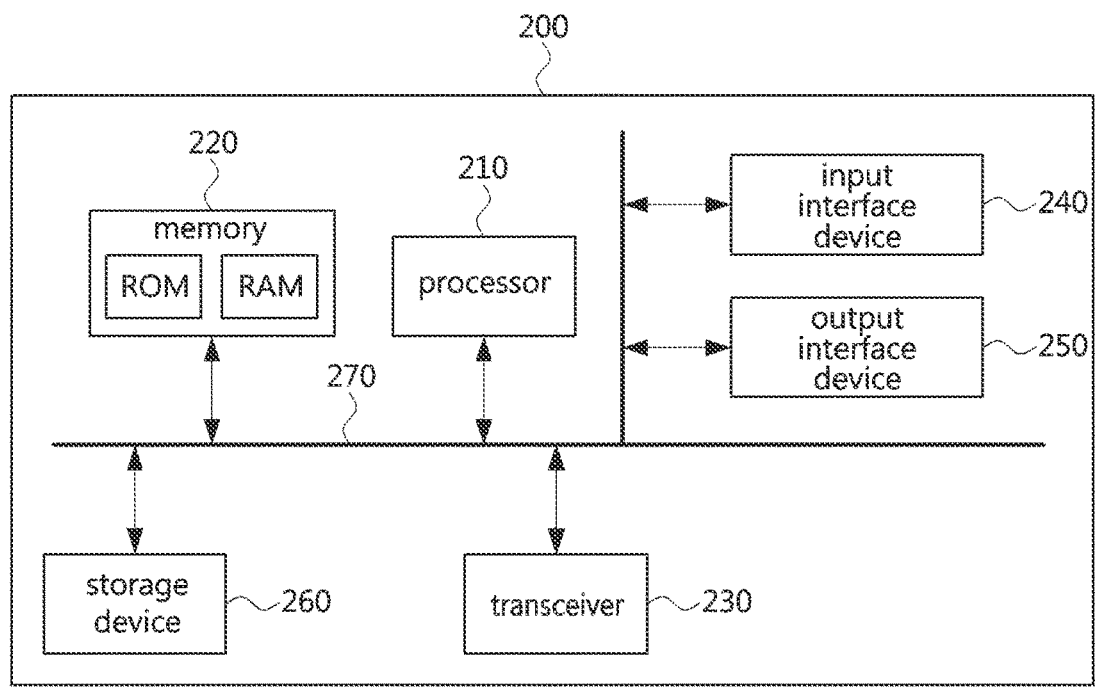
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, the respective components included in the communication node 200 may be connected through a separate interface or a separate bus around the processor 210 instead of the common bus 270. For example, the processor 210 may be connected to at least one of the memory 220, the transceiver 230, the input interface device 240, the output interface device 250, and the storage device 260 through a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, ng-eNB, base transceiver station (BTS), radio base station, radio transceiver, access point (AP), access node, road side unit (RSU), radio remote head (RRH), transmission point (TP), transmission and reception point (TRP), flexible-TRP (F-TRP), or the like. Each of the plurality of terminals 130-1, 130-2, 130-3, 130-4, 130-5, and 130-6 may be referred to as user equipment (UE), terminal, access terminal, mobile terminal, station, subscriber station, mobile station, portable subscriber station, node, device, apparatus supporting Internet of things (IoT) functions, mounted module/device/terminal, on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner.

Figure 3:
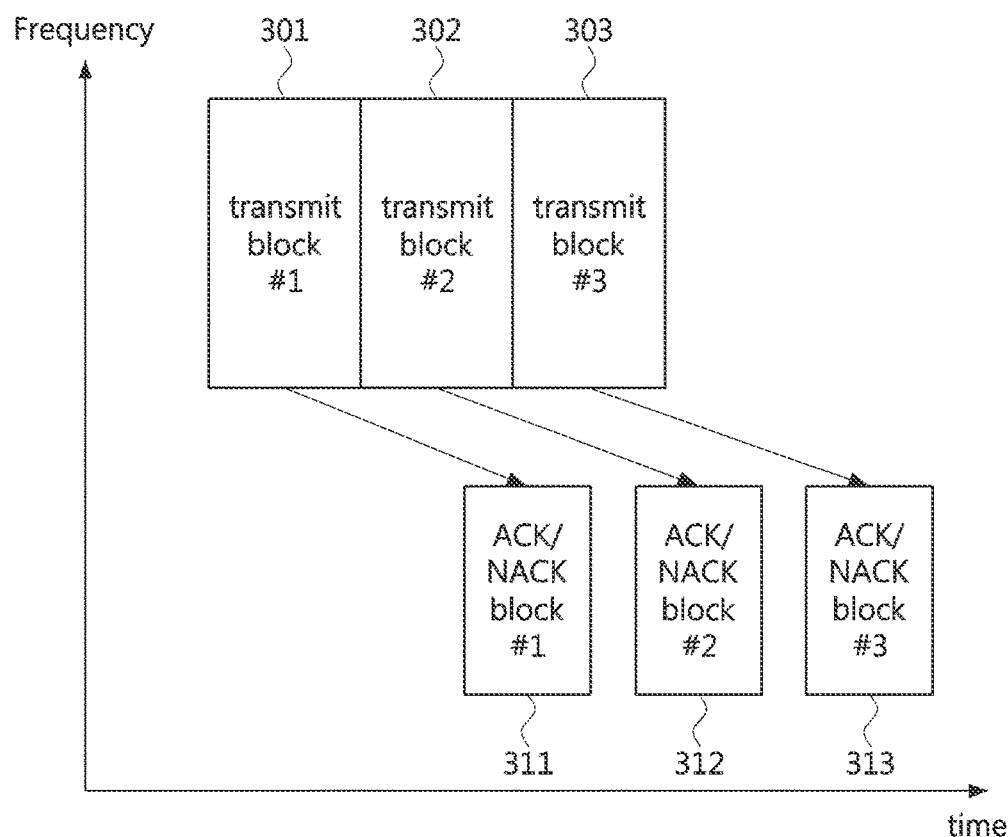
FIG. 3 is a conceptual diagram illustrating resource allocation according to a multi-level scheduling scheme according to an exemplary embodiment of the present disclosure.
Figure 4:
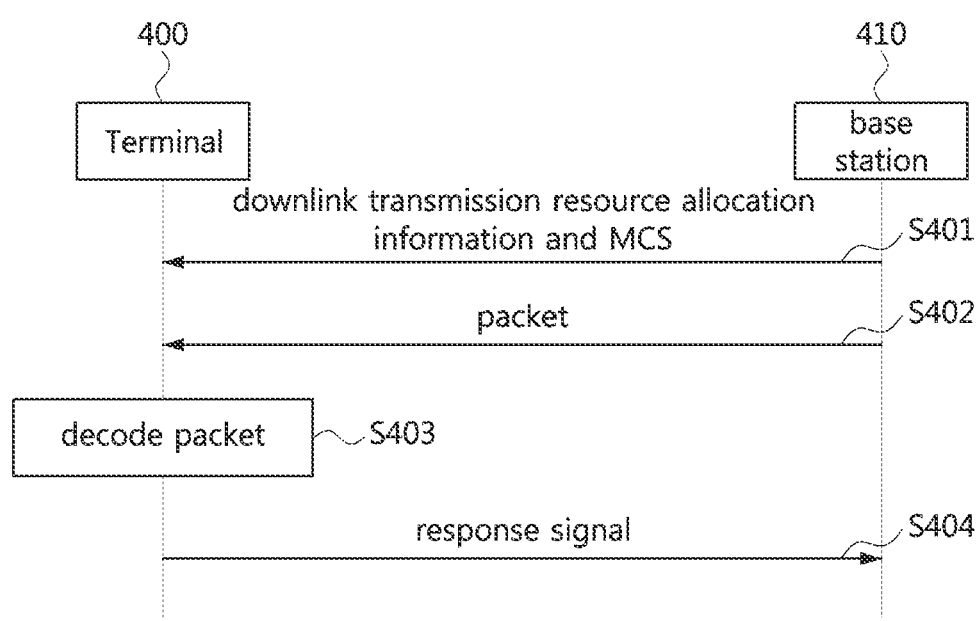
FIG. 4 is a sequence chart illustrating signal reception and response between a terminal and a base station according to an exemplary embodiment of the present disclosure.

FIG. 3 is a conceptual diagram illustrating resource allocation according to a multi-level scheduling scheme according to an exemplary embodiment of the present disclosure, and FIG. 4 is a sequence chart illustrating signal reception and response between a terminal and a base station according to an exemplary embodiment of the present disclosure.

Referring to FIGS. 3 and 4, a transmit block #1 301, a transmit block #2 302, and a transmit block #3 303 may be transmit blocks included in one packet. An ACK/NACK block #1 311, an ACK/NACK block #2 312, and an ACK/NACK block #3 313 may be ACK/NACK transmission resources for transmission of HARQ ACKs or NACKs.

The reliability targeted for the ultra-reliable low-latency communication (URLLC) may be a block error rate (BLER) of $10^{-9}$ to $10^{-5}$ per communication link. A scheduler may select a resource allocation and a modulation and coding scheme (MCS) for data, which meet such the low-latency and high-reliability requirements. One-shot scheduling may mean performing the resource allocation and MCS selection that satisfy a given time latency bound and a target BLER through a one-time scheduling. The lower the target BLER, the larger the amount of resources allocated through one-shot scheduling. In case that the target BLER is very low, even when all of the resources allocated through the one-shot scheduling are not received, in most of the cases, the terminals 400 can successfully perform demodulation and decoding.

If the requirements for time latency are not strict, an initial target BLER may be configured not to be too low, so that the amount of initially-allocated resources is not too large. In this case, retransmission may be performed through additional resource allocation only when a reception failure is identified. By reducing the amount of the initially-allocated resources, resource utilization efficiency can be improved and cell throughput also can be improved.

However, in the case of URLLC communication requiring a very high level of low-latency and reliability, it may be difficult to apply a general HARQ transmission scheme. Hereinafter, a method for efficiently using resources in the URLLC communication will be described.

A 'multi-level scheduling scheme' may be a scheme in which the target BLER is classified into an intermediate target BLER and a final target BLER, and independent resource allocation is performed for each target BLER (i.e., intermediate target BLER or final target BLER). Hereinafter, operations of a base station 410 transmitting a packet and a terminal 400 receiving the packet and transmitting an ACK/NACK signal as a response signal for the packet will be described.

In case of traffic for which data having a predetermined size is generated with a certain temporal pattern, such as communications performed for factory automation, a semi-persistent scheduling (SPS) scheme in which a certain time-frequency resource is periodically allocated may be suitable. In a dynamic scheduling scheme, L1/L2 control signaling can be used for the base station 410 to notify the terminal 400 of resource allocation information and MCS whenever the base station 410 transmits a packet to the terminal 400. On the other hand, since the L1/L2 control signaling is not required in the case where it is not absolutely necessary in the SPS scheme, if an L1/L2 semi-persistent scheduling is applied, the overhead due to the L1/L2 control signaling and the decrease in reception reliability can be avoided.

The base station 410 may inform the terminal 400 of downlink transmission resource allocation information and a MCS through downlink control information (DCI) at regular intervals through the semi-persistent scheduling (S401). The downlink transmission resource allocation information and the MCS may be configured differently for each transmit block (e.g., transmit blocks #1, #2, or #3) included in the packet. A target BLER of the transmit block #2 may be configured to be lower than a target BLER of the transmit block #1, and a target BLER of the transmit block #3 may be configured to be lower than the target BLER of the transmit block #2. That is, a lower reliability may be required for transmit blocks transmitted earlier among the transmit blocks included in the packet, and a higher reliability may be required for transmit blocks transmitted later than the transmit blocks transmitted earlier. Also, the base station 410 may allocate a transmission resource for each of the transmit blocks (i.e., transmit blocks #1, #2, and #3) included in the packet through DCI, and allocate an ACK/NACK transmission resource (e.g., ACK/NACK block #1, #2, or #3) for each of the transmit blocks (i.e., transmit blocks #1, #2, and #3) included in the packet through DCI. The base station 410 may transmit the packet to the terminal 400 based on the information transmitted in the step S401 (S402). The packet may comprise a plurality of transmit blocks. A plurality of transmit blocks (e.g., transmit blocks #1, #2, and #3) may be used for the transmission of one packet. ACK/NACK resources (e.g., ACK/NACK blocks #1, #2, and #3) corresponding to the respective transmit blocks may be provided. When resources used for transmission of the packet occupy a plurality of OFDM symbols, it may be preferable to have an ACK/NACK resource corresponding to each OFDM symbol used for transmission of the packet.

The ACK/NACK resources may be time-frequency resources separated from each other. Alternatively, in order to reduce the amount of the preconfigured ACK/NACK resources, some of the ACK/NACK resources may be configured to overlap each other, or the entire ACK/NACK resources may be configured to overlap with each other. For example, the ACK/NACK block #1, which is an ACK/NACK resource of the transmit block #1, and the ACK/NACK block #2, which is an ACK/NACK resource of the transmit block #2, may be the same resource. Alternatively, parts of the ACK/NACK block #1 and the ACK/NACK block #2 may be the same resource.

The terminal 400 may identify the downlink transmission resource allocation information and MCS through the DCI received from the base station 410. The terminal 400 may perform demodulation and decoding on the packet received from the base station 410 based on the received DCI (S403). When the semi-persistent scheduling is applied in the URLLC communication, if resources that can satisfy the target BLER are allocated in advance, too many resources may be allocated. In order to prevent such the excessive resource allocation, the terminal 400 may perform demodulation and decoding even when only a part of the packet is received, rather than performing demodulation and decoding after receiving the entire packet through the allocated resources. Therefore, the packet may be channel-coded so that a part of the packet can be demodulated and decoded even when only the part of the packet is received. Even when only a part of the entire packet is received, the terminal 400 may inform the base station 410 of the success in reception if it is determined that the reception is successful (S404). The base station 410 may stop transmission of the packet when a reception success message (e.g., ACK) is received from the terminal 400, and may continue to perform the transmission of the packet when a reception failure message (e.g., NACK) is received from the terminal 400.

The base station 410 may monitor the ACK/NACK resource, determine whether or not the terminal 400 has successfully received the packet by receiving an ACK signal through the ACK/NACK resource, and determine whether to continue transmitting the packet or stop the packet transmission. In the case of semi-persistent scheduling, a sufficient amount of resources may be allocated to the transmit blocks (e.g., transmit blocks #1, #2, and #3) to satisfy the target BLER. When the base station 410 receives an ACK signal from the terminal 400, the base station 410 may stop the packet transmission to the terminal 400, and may use the resources for other transmissions, which are allocated to the transmit block(s) whose transmission is stopped.

A sequence corresponding to the ACK and a sequence corresponding to the NACK may be configured differently. The terminal 400 may transmit the ACK sequence to the base station 410 when the packet reception is successful, and may transmit the NACK sequence to the base station 410 when the packet reception is unsuccessful. Alternatively, the terminal 400 may transmit the predetermined ACK sequence only when the reception is successful. The sequences of the ACK/NACK transmission resources corresponding to the respective transmit blocks may be configured differently for the respective transmit blocks. The base station 410 may identify a transmit block that has been successfully received through ACK/NACK sequence detection.

Alternatively, the terminal 400 may immediately transmit an ACK when the reception is successful, and when the reception of the transmit block fails, the terminal 400 may perform decoding again using the next transmit block without transmitting a NACK. That is, only when all transmit blocks are finally received but the decoding fails, the terminal may transmit the NACK (S404). Hereinafter, a specific operation method of the terminal 400 receiving a packet from the base station 410 and decoding the received packet will be described.

Figure 5:
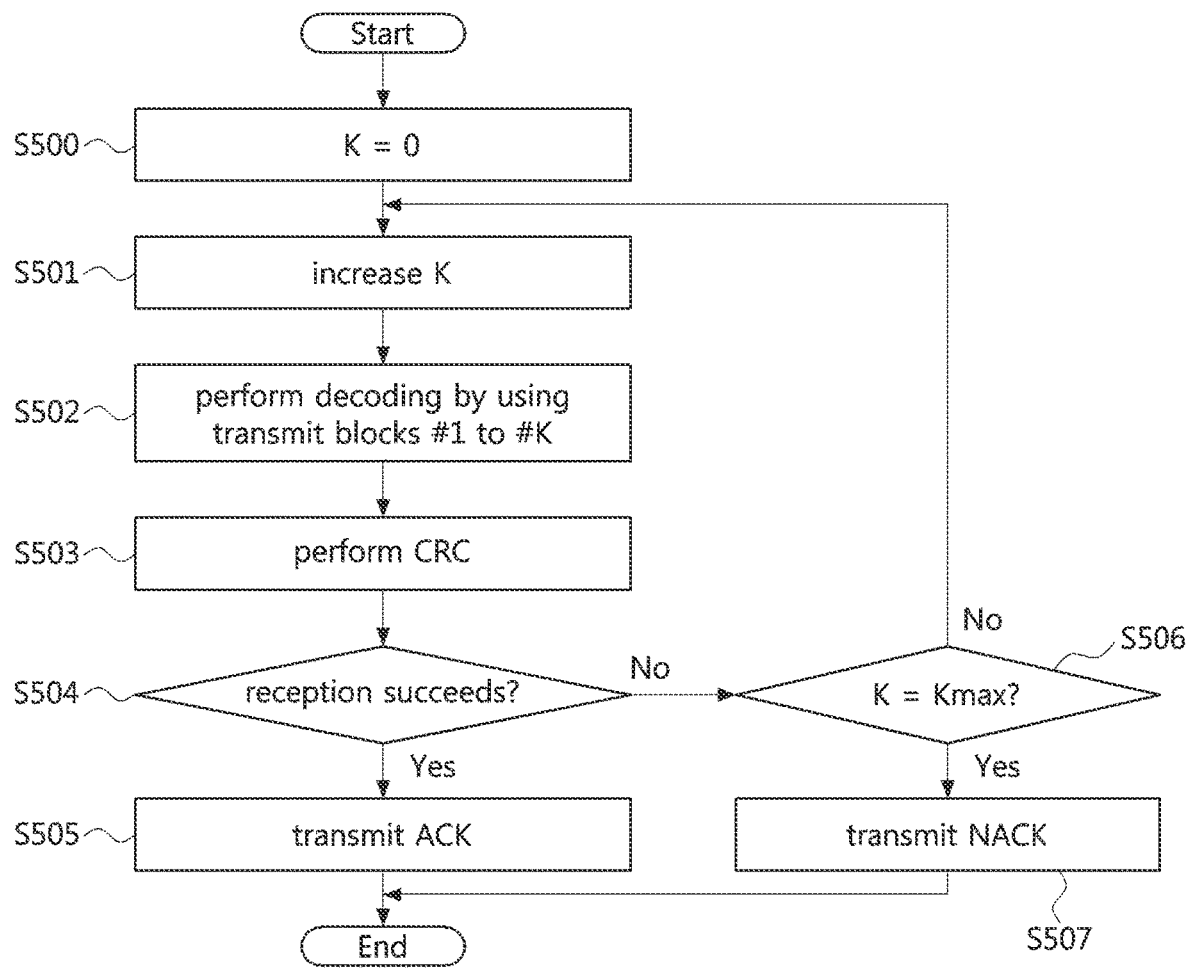
FIG. 5 is a flowchart illustrating an operation method of a terminal according to an exemplary embodiment of the present disclosure.

FIG. 5 is a flowchart illustrating an operation method of a terminal according to an exemplary embodiment of the present disclosure.

Referring to FIG. 5, a packet of FIG. 5 may be the same or similar to the packet of FIG. 3. It is assumed that the packet is composed of three transmit blocks (i.e., transmit blocks #1, #2, and #3). A terminal of FIG. 5 may be the terminal 400 of FIG. 4.

The terminal may initialize K indicating the number of transmit blocks on which decoding has been performed to 0 (S500). The terminal may increase K indicating the number of transmit blocks on which decoding has been performed by 1 (S501). When the first transmit block (i.e., transmit block #1) is received, the terminal may perform decoding on the first transmit block (i.e., transmit block #1) (S402). The terminal may perform a cyclic redundancy check (CRC) on the decoded transmit block #1 (S503). The terminal may identify whether the reception was successful through a result of the CRC (S504). When the result of the CRC is successful, the terminal may stop the decoding and transmit an ACK to the base station by using the ACK/NACK block #1 corresponding to the transmit block #1, which is the last transmit block used for the decoding (S505). When the result of the CRC indicates a reception failure, the terminal may check whether K indicating the number of transmit blocks on which the decoding has been performed is equal to $K_{max}$ indicating the total number of transmit blocks to be received (S506). When K is not equal to $K_{max}$, the terminal may return to the step S501. The terminal may increase K by 1 (S501). The terminal may perform decoding on the transmit block #1 and the transmit block #2 (S502). The terminal 400 may perform a CRC on the decoded transmit block #1 and transmit block #2 (S503). The terminal may identify whether the reception was successful through a result of the CRC (S504). When the result of the CRC is successful, the terminal may stop the decoding and transmit an ACK to the base station by using the ACK/NACK block #2 corresponding to the transmit block #2, which is the last transmit block used for the decoding (S505). When the result of the CRC indicates a reception failure, the terminal may check whether K indicating the number of transmit blocks on which the decoding has been performed is equal to $K_{max}$ indicating the total number of transmit blocks to be received (S506). When K is not equal to $K_{max}$, the terminal may return to the step S501. The terminal may increase K by 1 (S501). The terminal may perform decoding on the transmit block #1, the transmit block #2, and the transmit block #3 (S502). The terminal 400 may perform a CRC on the decoded transmit block #1, transmit block #2, and transmit block #3 (S503). The terminal 400 may perform a CRC on the decoded transmit block #1, transmit block #2, and transmit block #3 (S503). The terminal may identify whether the reception was successful through a result of the CRC (S504). When the result of the CRC is successful, the terminal may stop the decoding and transmit an ACK to the base station by using the ACK/NACK block #3 corresponding to the transmit block #3, which is the last transmit block used for the decoding (S505). When the result of the CRC indicates a reception failure, the terminal may check whether K indicating the number of transmit blocks on which the decoding has been performed is equal to $K_{max}$ indicating the total number of transmit blocks to be received (S506). When K is equal to $K_{max}$, it may mean that the terminal has received and decoded all the transmit blocks of the packet, but the reception of packet has failed. Therefore, even when the terminal receives all the transmit blocks of the packet and performs decoding, if the result of the CRC indicates a reception failure, the terminal may transmit a NACK to the base station (S507). That is, when the decoding has been performed by using all of the transmit blocks #1, #2, and #3, and the CRC result of the decoded transmit blocks indicates a reception failure, the terminal may transmit the NACK to the base station by using the ACK/NACK block #3, which is an ACK/NACK transmission resource corresponding to the last transmit block #3.

Figure 6:
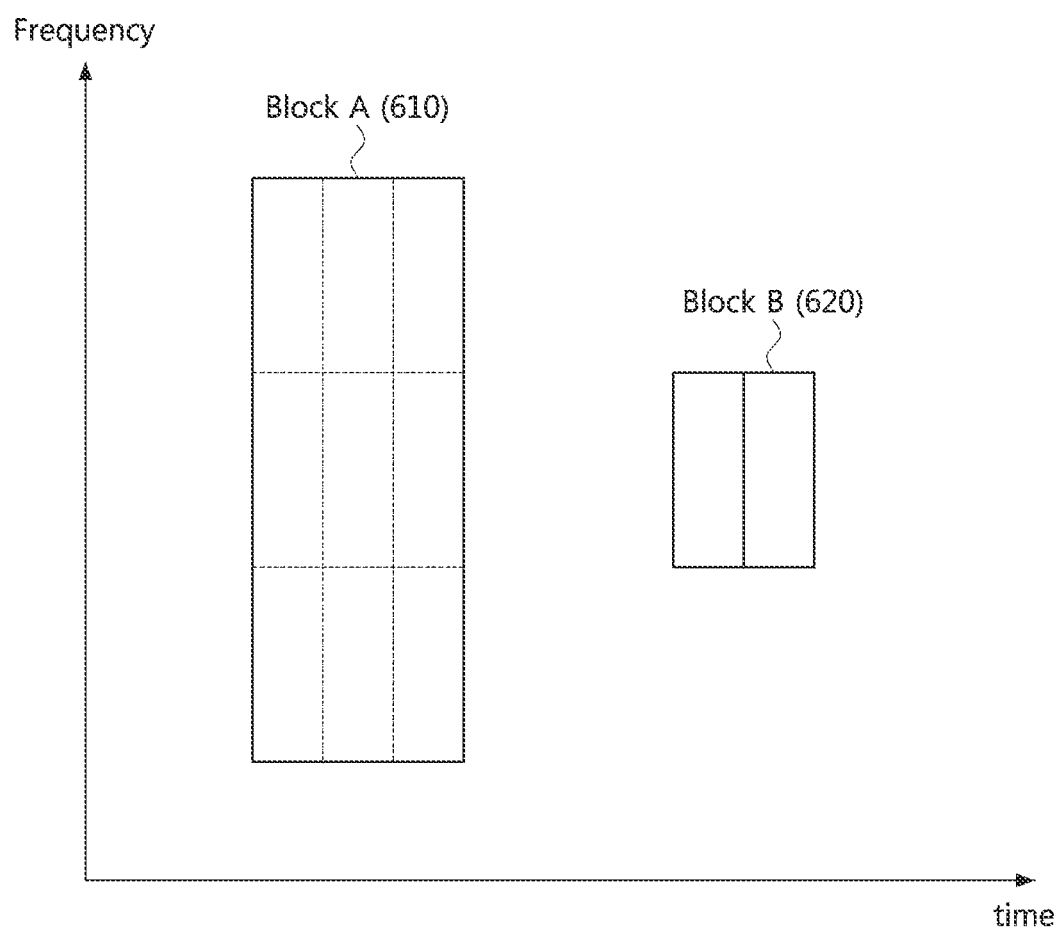
FIG. 6 is a conceptual diagram illustrating a method for combining orthogonal resources and non-orthogonal resources according to an exemplary embodiment of the present disclosure.

FIG. 6 is a conceptual diagram illustrating a method for combining orthogonal resources and non-orthogonal resources according to an exemplary embodiment of the present disclosure.

Referring to FIG. 6, a block A 610 may include orthogonal resources, and a block B 620 may include non-orthogonal resources. The base station 410 may transmit a part of the packet to be transmitted to the terminal 400 by using the orthogonal resources, and transmit the remaining part by using the non-orthogonal resources. The non-orthogonal resources may be shared by multiple communication nodes. The non-orthogonal resource may be allocated in advance through semi-persistent scheduling.

In downlink transmission, some of transmit blocks (e.g., block A) may be allocated to the orthogonal resources, and the remaining transmit blocks (e.g., block B) may be allocated to the non-orthogonal resources. The communication system may include a plurality of terminals. The terminals may decode the packet by using only the transmit blocks received through the orthogonal resources. However, terminals that fail to receive the packet through the orthogonal resources may receive the packet by using the non-orthogonal resources as well. Terminals that fail to decode the packet received through the orthogonal resources may decode the packet by using the transmit blocks received through both of the orthogonal resources and the non-orthogonal resources. Upon receiving the ACK from the terminal, the base station may stop transmitting the packet to the terminal that has transmitted the ACK. Upon receiving the NACK from the terminal, the base station may continue to transmit the packet to the terminal that transmitted the NACK. Since the base station stops transmitting the packet to the terminal that has transmitted the ACK, the terminals that have not successfully received the packet may receive improved quality signals because the number of packets transmitted by the base station to other terminals is reduced.

Similarly, in uplink transmission, some of transmit blocks (e.g., block A) may be allocated to the orthogonal resources, and the remaining transmit blocks (e.g., block B) may be allocated to the non-orthogonal resources. The base station may decode the packet by using only the transmit blocks received through the orthogonal resources. However, the base station that fails to receive the packet through the orthogonal resources may receive the packet by using the non-orthogonal resources as well. The base station that fails to decode the packet received through the orthogonal resources may decode the packet by using the transmit blocks received through both of the orthogonal resources and the non-orthogonal resources.

In case of uplink, the base station may perform demodulation and decoding on data transmitted by each terminal using the respective packets received from the terminals. Decoding on packets received from some terminals may be successfully performed, and decoding on packets received from other terminals may fail. Among the transmit blocks included in one packet, as the number of transmit blocks received at the base station increases, the number of terminals for which the decoding has been successfully performed may increase. The base station may request the terminal that transmitted the successfully-decoded packet to stop transmitting the packet. When the number of terminals in which transmission is stopped increases, the number of signals interfering with each other in the non-orthogonal transmission resources may be reduced. Even if the base station does not transmit a transmission stop signal to the terminals, the base station may perform interference cancellation on the signals received through the non-orthogonal resources by using the signals of terminals for which the decoding has been successfully performed with only the transmit blocks received through the orthogonal resources. That is, the base station may perform decoding on the signals received through the non-orthogonal resources by stopping packet transmission of the terminal or by performing interference cancellation on the received signals.

When initial transmit blocks are allocated to the orthogonal resources, and the subsequent transmit blocks are allocated to the non-orthogonal resources, resources used for packet transmission may be pre-allocated, thereby improving resource utilization efficiency. Alternatively, all the transmit blocks may be allocated to the non-orthogonal resources. Even when all the transmit blocks are allocated to the non-orthogonal resources, since the base station can allocate the resources used for packet transmission in advance, resource utilization efficiency may be increased. Hereinafter, a feedback method of the terminal, which is suitable for semi-persistent scheduling, will be described.

Figure 7:
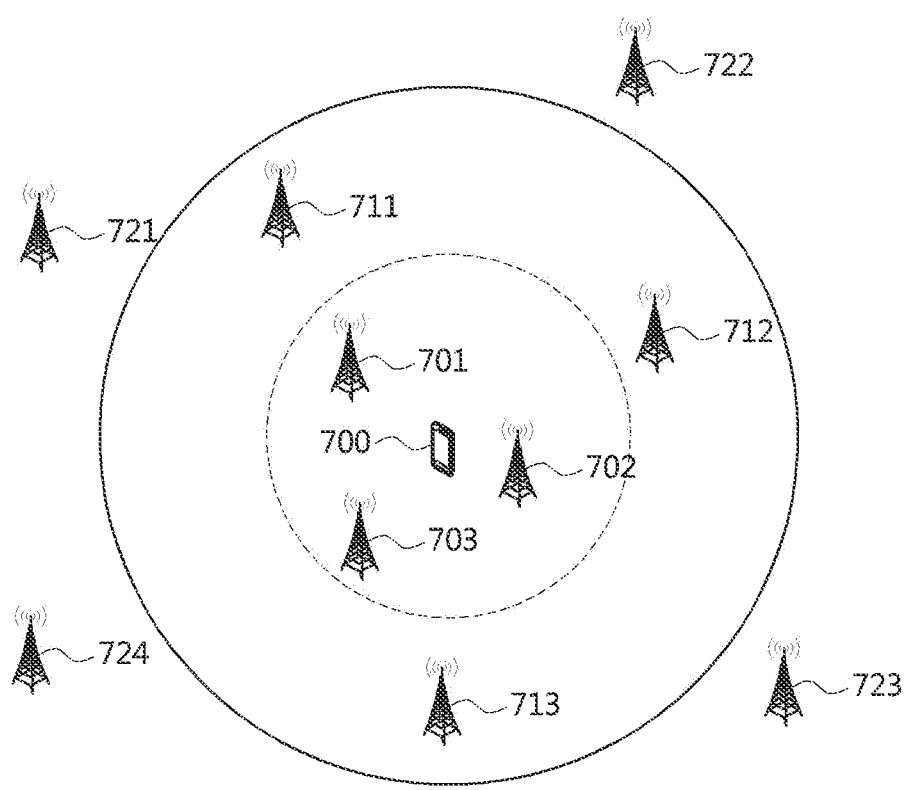
FIG. 7 is a conceptual diagram illustrating a communication system in which multi-point transmission is performed according to an exemplary embodiment of the present disclosure.
Figure 8:
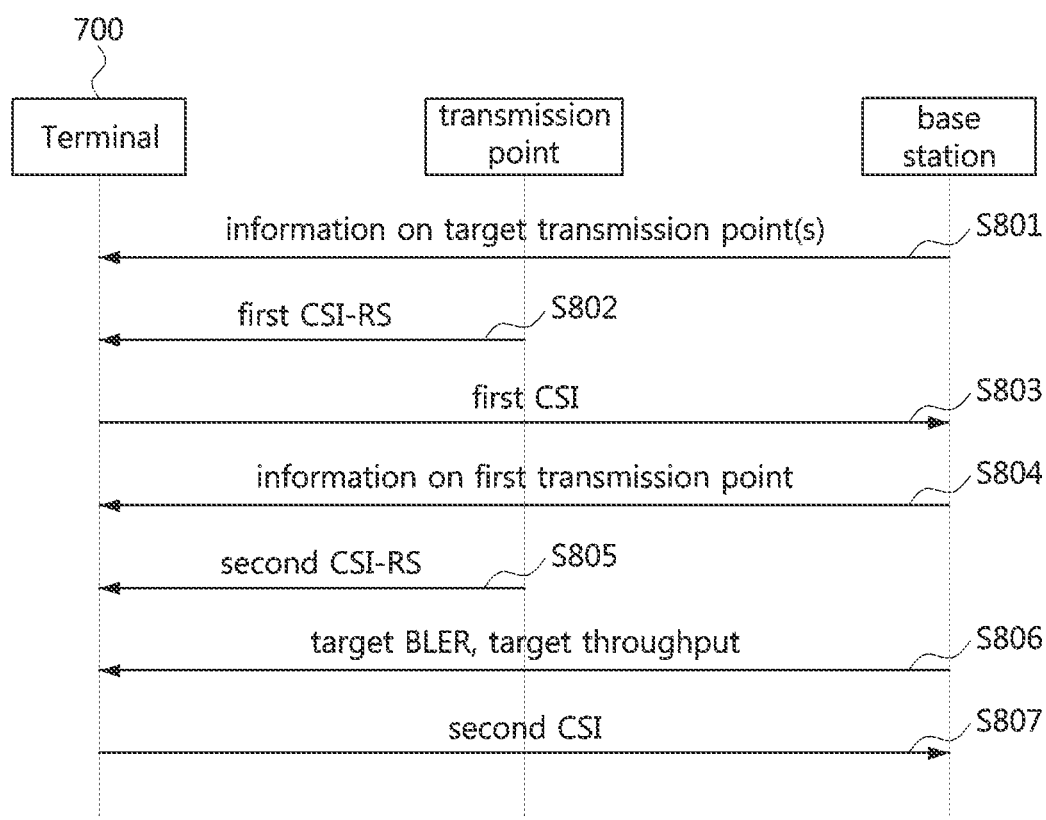
FIG. 8 is a sequence chart illustrating an operation between a base station and a terminal in a communication system in which multi-point transmission is performed.

FIG. 7 is a conceptual diagram illustrating a communication system in which multi-point transmission is performed according to an exemplary embodiment of the present disclosure, and FIG. 8 is a sequence chart illustrating an operation between a base station and a terminal in a communication system in which multi-point transmission is performed.

Referring to FIGS. 7 and 8, a communication system may include a terminal 700 and a plurality of transmission points (TPs) 701, 702, 703, 711, 712, 713, 721, 722, 723, and 724. The transmission point may perform transmission and reception operations. That is, the transmission point may be a transmission and reception point (TRP).

A terminal feedback method suitable for a resource allocation method through semi-persistent scheduling may be required. In case of frequency division duplex (FDD) downlink transmission, the base station may identify a downlink channel quality only through channel state information (CSI) feedback of the terminal. Even in the case of time division duplex (TDD) downlink transmission, the base station may identify the downlink channel quality through the CSI feedback of the terminal.

The terminal 700 may generate a type 1 CSI, which is a long-term CSI reflecting the long-term characteristics of the radio channel, and report it to the base station. The base station may determine transmission point(s), power control, and resource allocation through semi-persistent scheduling to be used for signal transmission based on the type 1 CSI.

Signal transmission and reception between the terminal 700 and the base station may be performed through a plurality of transmission points.

The base station may transmit signals to the terminal 700 through a plurality of transmission points. Here, it may be assumed that the mobility of the terminal is low. The base station may inform the terminal 700 of target transmission points that are the target of the type 1 CSI report which is the long-term CSI report (S801). For example, target transmission points that are the target of the type 1 CSI report may be the transmission point 701, transmission point 702, transmission point 703, transmission point 711, transmission point 712, and transmission point 713. The target transmission points (i.e., 701, 702, 703, 711, 712, and 713) may include transmission points that have possibility of transmitting signals to the terminal 700 and transmission points that may cause great interferences to the terminal 700.

The terminal 700 may receive reference signals (e.g., CSI-reference signal (CSI-RS)) from the target transmission points (S802). The terminal 700 may estimate a long-term signal-to-noise ratio (SNR) for each target transmission point based on the reference signal, and report it to the base station. The SNR estimation may be performed for each of predetermined transmit blocks. The terminal 700 may estimate the SNR for a plurality of resource blocks (RBs) or RB bundles. Alternatively, the terminal 700 may estimate the SNR for all available bands. The terminal 700 may estimate an interference-to-noise ratio (INR) using a specific resource allocated by the base station. The resource used for the INR estimation may be a resource that target transmission points do not use for transmission. The interference in the INR may include a thermal noise. The terminal 700 may transmit the type 1 CSI to the base station through the target transmission points (S803). The type 1 CSI may include the SNR and the INR.

The base station may determine at least one transmission point (e.g., transmission points 701, 702, and 703) to be used to transmit a packet to the terminal 700 based on the type 1 CSI of the terminal 700.

If the base station has only one transmission point, a selection of transmission point used to transmit packet is not necessary, and the target of the type 1 CSI report may be the transmission point of the base station. In this case, the above type 1 CSI may include the SNR and/or the INR for a wireless channel from the transmission point to the terminal. Hereinafter, the at least one transmission point used to transmit the packet may be referred to as 'first transmission point(s)'.

The base station may estimate an effective signal-to-interference noise ratio (SINR) for each transmit block for the case of transmitting the packet to the terminal 700 by using the first transmission point(s) (e.g., transmission points 701, 702, and 703). In case of non-coherent multi-point transmission, the base station may calculate the effective SINR for a transmit block N as shown in Equation 1.

$$SINR_N^{\it eff} = \frac{\sum_{k \in \{TTP\}} SNR_{i,N}}{INR_N + \sum_{k \in \{ITP\}} SNR_{i,N}} \quad \text{[Equation 1]}$$

Referring to Equation 1, {TTP} may denote a transmission point set comprising transmission points participating in packet transmission (e.g., transmission points 701, 702, and 703) among the target transmission points, and {ITP} may denote a transmission port set comprising transmission points not participating in the packet transmission among the target transmission points. Depending on a transmission scheme, {ITP} may be an empty set. When {ITP} is an empty set, all the target transmission points may participate in the packet transmission to the terminal 700.

Through the type 1 CSI, the base station may estimate the SINR experienced by the terminal 700 when the power of each transmission point belonging to the target transmission points is adjusted. Therefore, since the base station can estimate the SINR of the terminal according to the transmission point, resource, and transmission power to be used for transmission for the terminal 700 through the type 1 CSI, the base station may determine transmission point(s), resources, and transmission power, which are the most suitable for transmitting the packet to the terminal 700. The base station may transmit information on the first transmission point(s) (e.g., transmission points 701, 702, and 703) to the terminal 700 (S804).

The base station may inform the terminal 700 of resource allocation information to be used for type 2 CSI estimation through semi-persistent scheduling. The first transmission point(s) (e.g., transmission points 701, 702, and 703) may transmit reference signals (e.g., CSI-RS) to the terminal through allocated resources (S805). In addition, the base station may transmit information on a target BLER and a target throughput to the terminal 700 (S806). The terminal 700 may generate a type 2 CSI based on the reference signals, and report the generated type 2 CSI to the base station (S807). The base station may receive the type 2 CSI from the terminal 700. The base station may determine transmission parameters to be used for actual transmission including transmission power, precoder, MCS, resource allocation information, etc. to achieve both the target throughput and the target BLER based on the type 2 CSI. The target throughput may mean a predetermined size (bits) of a packet to be transmitted or a predetermined frequency utilization efficiency (e.g., bps/Hz) of a packet to be transmitted when the base station transmits the packet through the allocated resources. The resources allocated by the base station may be resources used by the base station to transmit the downlink packet to the terminal 700. The terminal 700 may estimate the type 2 CSI through the reference signals included in the allocated resources. The terminal 700 may report the type 2 CSI to the base station (S807).

When estimating the type 2 CSI, the terminal 700 may use predetermined value(s) for some or all of the transmission parameters such as the precoder, MCS, transmission power, and resources used for transmission. The base station may inform the terminal 700 of the predetermined transmission parameter value(s), and the terminal 700 may estimate the type 2 CSI using the predetermined parameter value(s). For the transmission parameters that are not previously determined, the terminal 700 may directly determine the values of the transmission parameters that are not determined, and report them to the base station as the type 2 CSI. Accordingly, the type 2 CSI that the terminal reports to the base station may be information on some or all of the transmission parameters including the precoder, MCS, transmission power, resources used for transmission, and the like.

The feedback method of the type 2 CSI may vary depending on the type of traffic. The type 2 CSI feedback for general traffic may be performed as follows. The base station may allocate resources for the terminal 700 to use for the type 2 CSI estimation based on the type 1 CSI, and may inform the terminal 700 of the allocated resources and the target BLER of the terminal 700. The terminal 700 may estimate at least one of a precoder, MCS, and change in the transmission power to satisfy the target BLER when transmitting a packet through the resources allocated by the base station. The terminal 700 may report the estimated value(s) to the base station together with a throughput achievable through the estimated value(s). The throughput may mean the maximum frequency utilization efficiency (e.g., bps/Hz) or the maximum size (bits) of the packet that can be transmitted for satisfying the target BLER when the base station transmits the packet through the allocated resources. Alternatively, the terminal 700 may use predetermined values for the precoder, MCS, and transmission power, and report a throughput achievable through the predetermined precoder, MCS, and transmission power to the base station. The base station may determine a precoder, MCS, transmission power, additional resource allocation, etc. to be used when transmitting a packet to the terminal 700 based on the type 2 CSI reported from the terminal 700.

The feedback of the type 2 CSI for predetermined traffic (i.e., deterministic traffic) may be performed as follows. The traffic generated in the closed loop control for factory automation may be traffic having a predetermined timing, size, and the like. That is, packets of a certain size may be generated with a known periodicity. Therefore, the size of the packet to be transmitted in one transmission from the base station to the terminal 700 or from the terminal 700 to the base station may be predetermined. The base station may determine the resource to be used for the type 2 CSI estimation at the terminal 700 based on the type 1 CSI, and may inform the terminal 700 of the allocated resource, the target BLER of the terminal 700 and the target throughput. As described before, the target throughput may mean a predetermined size (bits) of a packet to be transmitted or a predetermined frequency utilization efficiency (e.g., bps/Hz) of a packet to be transmitted when the base station transmits the packet through the allocated resources. The terminal 700 may estimate at least one of a precoder, an MCS, a change amount of the transmission power, and a change amount of the resource allocation to achieve the target BLER and the target throughput when transmitting a packet through the resource allocated from the base station. The terminal 700 may report the estimated value(s) to the base station. Alternatively, the terminal 700 may use predetermined values for the precoder, MCS, transmission power, and resource allocation information, and report a throughput achievable through the predetermined precoder, MCS, transmission power, and resource allocation information to the base station. The base station may determine a precoder, MCS, transmission power, resource allocation, etc. to be actually used when transmitting a packet to the terminal 700 based on the type 2 CSI reported from the terminal 700.

Alternatively, the CSI may be transmitted aperiodically. The terminal 700 may estimate a link quality of the packet being received, and report the estimated link quality of the packet to the base station. The terminal 700 may transmit an ACK when decoding of the received packet is successful, and transmit CSI when the decoding is unsuccessful. Upon receiving the ACK from the terminal 700, the base station may stop transmission of the packet, and upon receiving the CSI from the terminal 700, the base station may adjust the resources, transmission power, and resource allocation used for packet transmission based on the received CSI. The CSI may include information on a transmission power required to achieve the target BLER (e.g., an absolute value of the transmission power or a change in the transmission power), resource allocation information estimated to be required to achieve the target BLER (e.g., resource allocation or a change in the previous resource allocation), a frequency utilization efficiency (e.g., bps/Hz) or the size of transmission packet (e.g., bits) that can be achieved while satisfying the target BLER for each of one or more resource allocations, or the like.

The base station may determine the first transmission point(s) (e.g., transmission points 701, 702, and 703) through the type 1 CSI, and may determine transmission parameters based on the type 2 CSI. Thereafter, the base station may transmit a packet to the terminal 700 through the multi-level scheduling scheme described in FIGS. 3 and 4. That is, the base station may transmit a packet including a plurality of transmit blocks, and the terminal may perform decoding on received transmit block(s) even before receiving all of the transmit blocks included in the packet, and transmit an ACK when the decoding is successful. Upon receiving the ACK, the base station may stop the transmission of the packet even while transmitting the packet.

In addition, resources allocated to the packet transmitted from the base station to the terminal 700 may be allocated by the resource allocation scheme described in FIG. 6. That is, as shown in FIG. 6, the resources allocated to the packet transmitted from the base station to the terminal 700 may be non-orthogonal resources as well as orthogonal resources. A part of the packet transmitted by the base station may be transmitted through the orthogonal resources, and the other part of the packet may be transmitted through the non-orthogonal resources.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
receiving, from a base station, information on a requirement including information of target block error rates (BLERs) configured to have multi levels, wherein the multi levels of the target BLERs are configured respectively for a plurality of transmit blocks included in a first downlink (DL) packet;
transmitting, to the base station, first information including one or more transmission parameters for achieving the target BLERs and a target throughput included in the information on the requirement, wherein the one or more transmission parameters include at least one of precoder information, modulation and coding scheme (MCS) information, transmission power information, and resource allocation information;
performing a consecutive decoding for the plurality of transmit blocks included in the first DL packet transmitted from the base station; and
transmitting a first feedback signal based on a result of the consecutive decoding in a first feedback resource,
wherein an allocation of resource for the each of the plurality of transmit blocks included in the first DL packet is performed independently for each of the multi levels of the target BLERs, when cyclic redundancy check (CRC) operations for first to n-th transmit blocks among the plurality of transmit blocks are not successful and CRC operation for an (n+1)-th transmit block among the plurality of transmit blocks is successful in the consecutive decoding, the first feedback signal is an acknowledgement (ACK) signal and the first feedback resource is a resource allocated for a feedback operation for the (n+1)-th transmit block, and the n is a natural number.

2. The operation method according to claim 1, further comprising:
before the receiving the information on the requirement, receiving, from the base station, information of one or more target transmission points targeted for a report of first channel state information (CSI) among one or more transmission points included in the base station;
receiving a first CSI-reference signal (CSI-RS) from the one or more target transmission points;
transmitting the first CSI determined based on the first CSI-RS to the base station;
receiving, from the base station, information on one or more first transmission points which are determined based on the first CSI among the one or more target transmission points; and
receiving a second CSI-RS from the one or more first transmission points indicated by the information on the one or more first transmission points,
wherein the first CSI is a long-term CSI, the first CSI includes information on estimated signal-to-noise ratios (SNRs) for wireless channels from the one or more target transmission points to the terminal and information on interference-to-noise ratios (INRs) for the wireless channels in a second resource, and the second resource is a resource that the one or more target transmission points do not use for transmission.

3. The operation method according to claim 1, wherein, when the information on the requirement further includes a target throughput.

4. The operation method according to claim 3, wherein the target throughput is a predetermined size of the first DL packet or a predetermined frequency utilization efficiency of the first DL packet.

5. The operation method according to claim 1, wherein the performing of the consecutive decoding comprises:
receiving, by the terminal, the first transmit block among the plurality of transmit blocks included in the first DL packet;
performing, by the terminal, decoding on the first transmit block;
when the decoding fails, receiving, by the terminal, a second transmit block among the plurality of transmit blocks included in the first DL packet; and
performing, by the terminal, decoding on the first and second transmit blocks, wherein a first level of a first target BLER corresponding to the first transmit block is higher than a second level of a second target BLER corresponding to the first transmit block.

6. The operation method according to claim 5, wherein when all the CRC operations for the plurality of transmit blocks are not successful in the consecutive decoding, the first feedback signal is a negative acknowledgement (NACK) signal and the first feedback resource is a resource allocated for a feedback operation for the m-th transmit block, and the m is a natural number corresponding to a number of the plurality of transmit blocks.

7. The operation method according to claim 1, wherein the ACK signal is configured to request the base station to stop transmission of the first DL packet.

8. The operation method according to claim 1, further comprising:
when a plurality of transmit blocks included in a second DL packet transmitted from the base station include one or more orthogonal transmit blocks allocated to orthogonal resources and one or more non-orthogonal transmit blocks allocated to non-orthogonal resources, receiving the one or more orthogonal transmit blocks;
receiving the one or more non-orthogonal transmit blocks; and
performing decoding on the one or more orthogonal transmit blocks and the one or more non-orthogonal transmit blocks.

9. An operation method of a base station, the operation method comprising:
transmitting, to a terminal, information on a requirement including information of target block error rates (BLERs) configured to have multi levels, wherein the multi levels of the target BLERs are configured respectively for a plurality of transmit blocks included in a first downlink (DL) packet;
receiving, from the terminal, first information including one or more transmission parameters for achieving the target BLERs and a target throughput included in the information on the requirement, wherein the one or more transmission parameters include at least one of precoder information, modulation and coding scheme (MCS) information, transmission power information, and resource allocation information;
transmitting the first DL packet to the terminal; and
receiving a first feedback signal transmitted based on a result of a consecutive decoding performed for the plurality of transmit blocks included in the first DL packet by the terminal,
wherein an allocation of resource for the each of the plurality of transmit blocks included in the first DL packet is performed independently for each of the multi levels of the target BLERs, when cyclic redundancy check (CRC) operations for first to n-th transmit blocks among the plurality of transmit blocks are not successful and CRC operation for an (n+1)-th transmit block among the plurality of transmit blocks is successful in the consecutive decoding, the first feedback signal is an ACK signal and the first feedback signal is received in a first feedback resource allocated for a feedback operation for the (n+1)-th transmit block, and the n is a natural number.

10. The operation method according to claim 9, further comprising:
before the transmitting the information on the requirement, transmitting, to the terminal, information of one or more target transmission points targeted for a report of first channel state information (CSI) among one or more transmission points included in the base station;
transmitting a first CSI-reference signal (CSI-RS) to the terminal through the one or more target transmission points;
receiving the first CSI determined based on the first CSI-RS from the terminal;
transmitting information on one or more first transmission points determined based on the first CSI to the terminal; and
transmitting, to the terminal, a second CSI-RS through the one or more first transmission points indicated by the information on the one or more first transmission points;
wherein the first CSI is a long-term CSI, the first CSI includes information on estimated signal-to-noise ratios (SNRs) for wireless channels from the one or more target transmission points to the terminal and information on interference-to-noise ratios (INRs) for the wireless channels in a second resource, and the second resource is a resource that the one or more target transmission points do not use for transmission.

11. The operation method according to claim 9, wherein, when the information on the requirement further includes a target throughput.

12. The operation method according to claim 11, wherein the target throughput is a predetermined size of the first DL packet or a predetermined frequency utilization efficiency of the first DL packet.

13. The operation method according to claim 9, wherein the transmitting of the first DL packet comprises:
determining one or more transmission parameters used for downlink transmission based on the one or more transmission parameters for achieving the requirements;
transmitting a first transmit block of the first DL packet to the terminal; and
when there is no request to stop transmission of the first DL packet from the terminal, transmitting a second transmit block of the first DL packet to the terminal.

14. The operation method according to claim 13, wherein when all the CRC operations for the plurality of transmit blocks are not successful in the consecutive decoding, the receiving of the first signal comprises:
receiving the first signal which is a negative acknowledgment (NACK) signal from the terminal in a second feedback resource allocated for a feedback operation for the m-th transmit block; and
retransmitting the first DL packet to the terminal,
wherein the m is a natural number corresponding to a number of the plurality of transmit blocks.

15. The operation method according to claim 9, further comprising:
when a plurality of transmit blocks included in a second DL packet include one or more orthogonal transmit blocks allocated to orthogonal resources and one or more non-orthogonal transmit blocks allocated to non-orthogonal resources, transmitting the one or more orthogonal transmit blocks to the terminal; and
transmitting the one or more non-orthogonal transmit blocks to the terminal.

16. A terminal in a communication system, the terminal comprising:
a processor; and
a memory storing at least one instruction executable by the processor,
wherein when executed by the processor, the at least one instruction causes the processor to:

receive, from a base station, information on a requirement including information of target block error rates (BLERs) configured to have multi levels, wherein the multi levels of the target BLERs are configured respectively for a plurality of transmit blocks included in a first downlink (DL) packet;

transmit, to the base station, first information including one or more transmission parameters for achieving the target BLERs and a target throughput included in the information on the requirement, wherein the one or more transmission parameters include at least one of precoder information, modulation and coding scheme (MCS) information, transmission power information, and resource allocation information;

perform a consecutive decoding for the plurality of transmit blocks included in the first DL packet transmitted from the base station; and transmit a first feedback signal based on a result of the consecutive decoding in a first feedback resource, wherein an allocation of resource for the each of the plurality of transmit blocks included in the first DL packet is performed independently for each of the multi levels of the target BLERs, when cyclic redundancy check (CRC) operations for first to n-th transmit blocks among the plurality of transmit blocks are not successful and CRC operation for an (n+1)-th transmit block among the plurality of transmit blocks is successful in the consecutive decoding, the first feedback signal is an acknowledgement (ACK) signal and the first feedback resource is a resource allocated for a feedback operation for the (n+1)-th transmit block, and the n is a natural number.

17. The terminal according to claim 16, wherein the information on the requirement further includes a target throughput, and the target throughput is a predetermined size of the first DL packet or a predetermined frequency utilization efficiency of the first DL packet.

* * * * *